United States Patent
Kahn

(10) Patent No.: US 7,918,387 B2
(45) Date of Patent: Apr. 5, 2011

(54) THREAD IDENTIFICATION SYSTEM

(76) Inventor: Jerome Kahn, Hutchinson, KS (US)

(*) Notice: Subject to any disclaimer, the term of this patent is extended or adjusted under 35 U.S.C. 154(b) by 257 days.

(21) Appl. No.: 12/264,623

(22) Filed: Nov. 4, 2008

(65) Prior Publication Data

US 2010/0108754 A1   May 6, 2010

(51) Int. Cl.
*G06F 17/00* (2006.01)
(52) U.S. Cl. .......................... 235/375; 235/376
(58) Field of Classification Search .............. 235/375, 235/376, 380; 705/7–11, 28
See application file for complete search history.

(56) References Cited

U.S. PATENT DOCUMENTS

| | | | |
|---|---|---|---|
| 5,904,109 A | 5/1999 | Asano | |
| 6,022,124 A * | 2/2000 | Bourn et al. | 362/247 |
| 6,112,508 A * | 9/2000 | Felix | 57/265 |
| 6,983,192 B2 | 1/2006 | Block et al. | |
| 7,055,443 B2 | 6/2006 | Goto et al. | |
| 7,212,879 B2 | 5/2007 | Hagino | |
| 7,228,195 B2 | 6/2007 | Hagino | |
| 2006/0064195 A1 | 3/2006 | Kern et al. | |
| 2006/0232778 A1* | 10/2006 | Gneupel | 356/429 |

* cited by examiner

*Primary Examiner* — Michael G Lee
*Assistant Examiner* — Matthew Mikels
(74) *Attorney, Agent, or Firm* — Christopher & Weisberg, P.A.

(57) ABSTRACT

A label having a coded pattern provides information regarding the type of thread on a thread spool loaded on an embroidery machine and feeding one of the needles. A detector positioned at the base of a spindle on the thread tree reads the label. The label is attached to the bottom of a thread spool such that it is substantially flush with the detector. The label has a pattern that is readable by the detector regardless of its rotational orientation and provides information about the type of thread on the spool. This pattern corresponds to thread type information stored in data base.

19 Claims, 6 Drawing Sheets

THREAD IDENTIFICATION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The present invention relates to a system for identifying thread spools on an embroidery machine. Specifically, the invention relates to a system using patterned labels to electronically identify the thread types loaded on various spindles of an automated embroidery machine.

2. Prior Art

Stitching machines capable of stitching or embroidering complex patterns into garments or fabric using multiple colors are common in the garment personalization industry. Typical embroidery machines have several needles, each threaded with a different type of thread. A pattern often requires threads having different colors, thicknesses and compositions. A skilled artisan of embroidery will appreciate that a nimiety of different thread types are used for stitching embroidery patterns. Furthermore, each thread manufacturer's product differs. These distinctions can be significant, even though the thread is ostensibly of the same type, thickness and material. It is therefore important in the stitching industry to identify thread types according to a variety of thread identifying characteristics, or thread data, including, but not limited to, material composition, thickness, color, manufacture, amount of thread on the spool, tensile strength, and other factors by which an embroiderer may wish to distinguish threads.

Stitching and embroidery machines are commonly controlled by a computer system. The computer system converts an embroidery pattern into a series of stitch commands directing the various needles, each fed by a different thread spool, to form the pattern given. Typically, thread data for particular threads and the needle to which they are connected are manually entered into the operating software by the user.

Manually entering the thread data including thread material, thickness, color, manufacturer and other parameters is time consuming. In particular, in an embroidery machine having several needles each fed by a corresponding thread spool, the amount of data inputted into the computer system becomes large. The data entry of a large amount of relatively tedious data is also conducive to human error which can lead to expensive, easily avoidable mistakes downstream in the embroidery process. It would therefore be beneficial to provide a means to for the computer system that operates an embroidery machine to be provided thread data accurately, quickly, and automatically.

U.S. Pat. No. 7,055,443 to Goto et al. discloses a method for identifying the color of a thread loaded on an embroidery machine. This method uses a reflected beam of light to determine the color of a thread fed to a needle on the machine. The Goto patent uses a photoelectric emitter and receiver system for identifying thread color directly. The optical reading mechanism that determines the color of a thread may be used to provide or confirm information to a computer system regarding the color of thread on a particular needle. However, this system does not provide any information about the composition, thickness or other thread data.

U.S. Pat. No. 7,228,195 to Hagino discloses an embroidery machine and system for identifying the characteristics of a thread loaded onto a spindle of an embroidery machine. The system utilizes a wireless tag located on the thread reel. A receiver on the embroidery machine reads information from the wireless tag by means of an electromagnetic signal. This information may be directly provided electronically to the computer system controlling the embroidery machine.

This patent discloses a method of storing thread data encoded in a wireless tag. Use of such tags is only practical when wireless tags and code patterns are ubiquitously adopted throughout the embroidery industry. Otherwise, different manufacturers may use the same wireless signals to identify different types of threads. In addition, the only information encoded on the wireless tag will be that which the manufacturer chooses to include. The operator of an embroidery system, that is, the end user who benefits from and utilizes the identifying tag, has no control over the information stored on the reel.

It would be preferable for the end user, the machine operator, to be able to print off a label having the desired information for a thread spool and readable by a computer detector or sensor. However, thread spools are circular and do not have classical front, back and sides. Therefore, any label on a spool would have to be carefully rotationally aligned with a label reader about a stand rod or spindle on the thread tree base.

It would therefore be beneficial to provide a means for a computer system that operates an embroidery machine to be provided thread data automatically by a label on the thread spool.

It is also desirable to provide a label for a thread spool that provides thread identifying data directly to an embroidery machine computer system.

It is also desirable to provide a label for providing thread identifying data directly to an embroidery machine computer system that allows the end user to determine the information stored on the label.

BRIEF SUMMARY OF THE INVENTION

The thread identification system of the invention provides accurate real-time thread data for thread mounted on an embroidery machine to a computer system operating the machine. The thread data may include the machine and specific needle on which the thread is located, the color of the thread and other information the embroidery machine operator may deem desirable. The invention overcomes the deficiencies of the prior art by using a circular label affixed to the base of a spool of thread and may be read by a detector at the base of the spindle on which the spools sits. The label has a pattern encoding desired thread data. The detector typically includes an array of sensors that read the encoded pattern on the label. The code is thereby read and provided to a computer system operating the machinery. The computer system translates the code into thread data that is then used by the computer system to generate commands for the embroidery machine. The thread data may be used for other purposes as well. For example, the computer system may include programming to monitor thread use. The thread data may include the amount of thread on the spool, and the programming may use this information to alert the operator when a spool is almost out of thread.

The label uses a pattern of cells having reflecting properties to encode the thread information. The reflective properties may be simple, such as being reflective versus non-reflective, thereby creating a monochromatic, binary code. The code may be more complex, and store more information, by using more complex reflective properties. The pattern may be made up of cells having many different colors. The detector may use sensors that can determine the wavelengths being reflected by the cells. Generally, a monochromatic code is preferred. This allows inexpensive, non-color printers to print the labels and similarly allows simple, inexpensive sensors to detect whether the cells are reflective or non-reflective.

The label has a series of circular bands. Each band is divided into a series of cells. Each of the cells is printed, for example, either black (non-reflective) or white (reflective). The code reader has a series of sensors arranged in one or more rings so that they read every cell in each band. A thread type is encoded by corresponding the total number of cells per band having a particular reflective property to a particular thread type. In that way, the pattern of the cells may be read regardless of the rotational orientation of the label. The total reflective and/or non-reflective cells are counted for each band.

Alternatively, one of the bands may serve as an index band in which all but one of the cells is reflective, or conversely, all but one of the cells is non-reflective. This one distinct cell serves as an index cell. Cells in other bands that align within the same sector of the label as the index cell are used as starting points for a binary (or more complex), linear sequence of cells along each of the other bands. This greatly increases the amount of information that may be stored in the pattern on the label. Using a broader spectrum of colors in the cells and sensors that can detect distinct colors may further expand the amount of information that may be stored in the pattern on a label of the invention.

It is therefore an object of the invention to provide a label for the base of a thread spool that may be read by a detector on the base of a thread tree regardless of the rotational orientation between the reader and the label.

It is also an object of the invention to provide a label for the base of a thread spool that may be read by a detector on the base of a thread tree regardless of the rotational orientation between the reader and the label that provides thread data to a computer system.

It is also an object of the invention to provide a label that may be printed by an embroidery machine operator for the base of a thread spool that may be read by a detector on the base of a thread tree regardless of the rotational orientation between the reader and the label that provides thread data to a computer system.

DETAILED DESCRIPTION OF THE INVENTION

Figure 1:
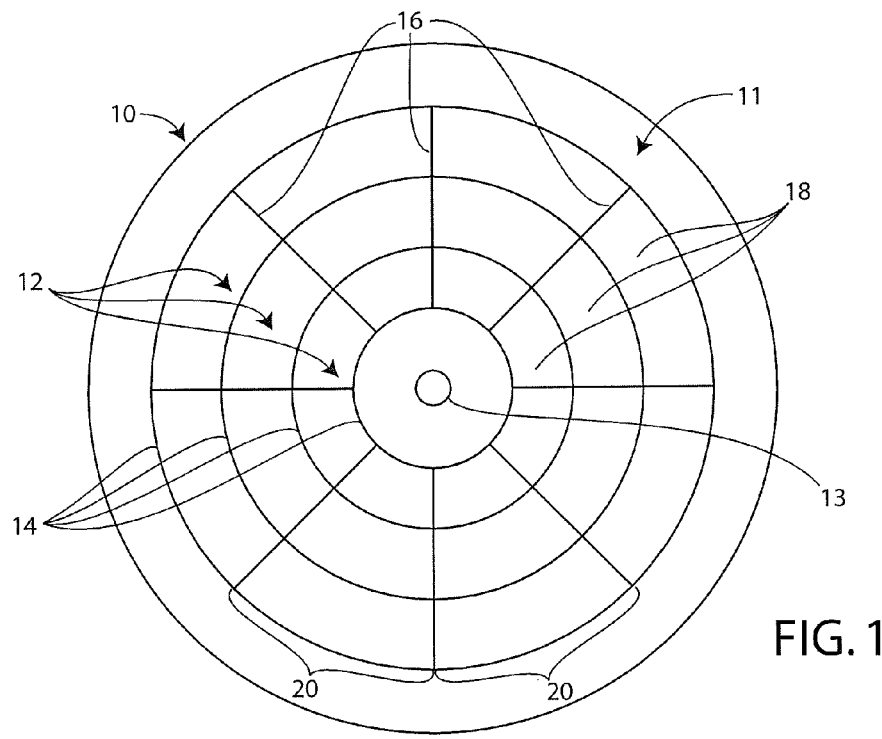
FIG. 1 is a label of the invention.

The invention provides accurate real-time thread data for thread spools mounted on an embroidery machine. The thread data may include the machine on which the thread spool is located, which needle on the machine it feeds, the color, thickness, composition, manufacturer, stock or lot number, and the like of the thread and other information the embroidery machine user deems desirable. This information can be applied in many useful ways.

Knowledge of what color thread is on each needle of a machine enables a computer controlled embroidery machine to automatically pre-assign the appropriate needles for each color change, for single and multicolor patterns, prior to downloading the pattern, into the computer memory. This eliminates time consuming and error prone steps in setup of the computer and the embroidery machine, which require the operator to manually setup the needle numbers for each color change prior to running the machine or upon the machine's first sew-out, referred to as the "teaching" of the machine. A relationship of actual thread types on the machine vs. required thread types need for particular sewing patterns would enable a computer to automatically determine which needles to use for each color in a pattern.

In larger facilities, several embroidery machines may be operated by the same computer system. Knowledge and tracking of what thread each machine in a facility has by the computer system operating them can reduce the number of time consuming thread changes. The sequence of embroidery designs may be organized such that designs which have the most colors in common are sequenced logically to maximize the current thread colors on any particular machine. Machine operators can be instructed to change threads on particular needles which are not being currently used in preparation for the next design's requirements.

Knowledge of what color thread is on each needle also enables predictive scheduling algorithms that suggest the machine most closely set up in loaded threads to run a particular job, thereby reducing order-to-order setup time at the machine.

The thread identification system includes two interrelated components: a coded circular label affixed to the base of each thread spool and a label reading detector at the base of the spindles on a sewing machine's thread tree.

The circular label is attached to the base of a cone of thread, or spool. It is imprinted with one or more concentric bands divided into multiple cells each having a reflective property. For simplicity, the cells may be printed in a monochromatic scheme, each cell being entirely black or white, such that each cell is either reflective or non-reflective of substantially all visible wavelengths. This simple monochromatic scheme allows the labels to be printed by a simple black and white printer and copied by a black and white copier. It also simplifies reading of the cells, in that a photoreceptor need only detect whether there is reflectivity, and not the type of reflectivity, for each cell.

Optionally, the cells may be colored a plurality of colors so that each one is reflective of certain wavelengths but not others. This expands the number of possible patterns, greatly increasing the amount of information that may be stored in the pattern. However, this does not allow a simple, black and white computer printer or copier to produce the labels and requires more complex photoreceptors to read the reflective property of the cell.

The detector is affixed to an embroidery, monogram, or sewing machine about the base of a spindle of the thread tree. One detector per thread spool is required. The individual detectors may be combined or multiplexed as a single logical entity. The detectors may be permanently embedded in the base of the thread tree stand of an embroidery machine, or may be designed to lay on top of the base of a thread tree, so that an existing machine may be retrofitted with the invention. So long as the detector is located at a position about the machine that allows a thread spool to be positioned such that the label is facing the detector, the invention should operate. The detector includes plural sensors capable of detecting the reflective properties of cells on a label that has been placed facing the reader. As will be explained below, the detector may read the pattern created by the cells of the label regardless of the rotational orientation of the label and the detector. That is, the detector and the label do not need to be aligned in any particular way. In fact, a spool with a label may be placed on a thread tree over a reader, pivoted about the spool bar so that the label and detector are randomly re-aligned with a new rotational orientation, and the detector is still able to read the pattern of the label.

Each spool of thread is given a coded pattern based upon its color, stock number and/or other thread data. This pattern is used to identify the thread on the spool for the computer software used in conjunction with the embroidery machine. The actual code is assigned by the end user. The code is preferably imprinted by the end user with special software that prints onto card stock or adhesive label stock. This coded label is then affixed to the base of the thread cone and placed on a code reader on a thread tree or placed in inventory for future use on a machine.

Each code reader corresponds to a particular needle, allowing an operator or computer to discriminate the thread to needle relationships. There are preferably as many code readers as there are needles. One or all sewing heads on a machine may be fitted with code readers. Each code reader contains reflective object sensors able to measure the reflectivity of the cells of the label. Typically, a reflective object sensor emits visible light, usually white light, and includes a detector that determines whether light is reflected back onto the sensor. Typical reflective object sensors detect whether an object such as a cell of a label are either reflective or non-reflective. This allows a label having a monochromatic pattern to use a binary code of reflective and non-reflective cells to store thread data. As mentioned above, more complex, wavelength discriminating reflective object sensors can distinguish which particular wavelengths of light are received by the receptor portion of the device. These may be used with labels having many different colors.

Those skilled in the art of data storage will appreciate that there are many methods for storing code patterns, binary and otherwise. In the present invention, it is generally preferred to store thread data on labels using cells having alternating reflecting properties because the labels may be printed using readily available printers and reflective object sensors are small and readily available. Those skilled in the art will appreciate that there are a variety of reflective sensors suitable for use in the invention, including laser scanning sensors and the like in addition to simpler sensors utilizing non-cohesive light.

FIG. 1 shows a label 10 for use with the invention. Label 10 has a pattern 11 comprised of three concentric bands 12. Concentric bands 12 are delineated by concentric circles 14 centered around center hole 13. Label 10 is preferably adhesive on the side opposite the pattern 11 and is attachable to the bottom of a thread spool. Center hole 13 allows access of a stand bar or spindle through the label 10 and into a shaft in the center of the spool to which it is attached.

Pattern 11 is divided into eight sectors 20 by eight radial lines 16, which also divide each of the bands 12 into individual coding cells 18. Each of the coding cells 18 may be given a reflective property, preferably when the label is printed, such that it may be photometrically and/or spectrometrically identified. When the label 10 and its pattern 11 are printed using a typical printer, reflective properties may be applied to the coding cells 18 by printing them as a solid color.

The cells 18 within a particular band are congruent, i.e. they are the same size, all having equivalent dimensions. This congruency between cells of the same band is an important aspect of the invention that allows the pattern of the label to be read by a detector regardless of rotational orientation between the label and detector.

In this embodiment, pattern 11 is annular and comprised of three concentric bands 12. However, more or fewer bands may be used as desired and depending on the amount of information to be stored in the pattern. Also, each of the bands 12 in this embodiment are divided into eight coding cells 18 by eight radial lines 16 that also divide the pattern 11 into congruent, radially symmetric sectors 20. It may be desirable to divide the bands into more or fewer cells by using more or fewer radial lines. It is not necessary that the cells of different bands are delineated by the same radial lines such that the pattern is divided into sectors. However, the radial symmetry of forming congruent sectors is preferred as it simplifies the pattern and allows for the inner band to serve as an index band. As will be seen below, any radial symmetry of the label does not usually result in any symmetry in the actual pattern formed by the reflective properties of the coding cells.

Figure 2:
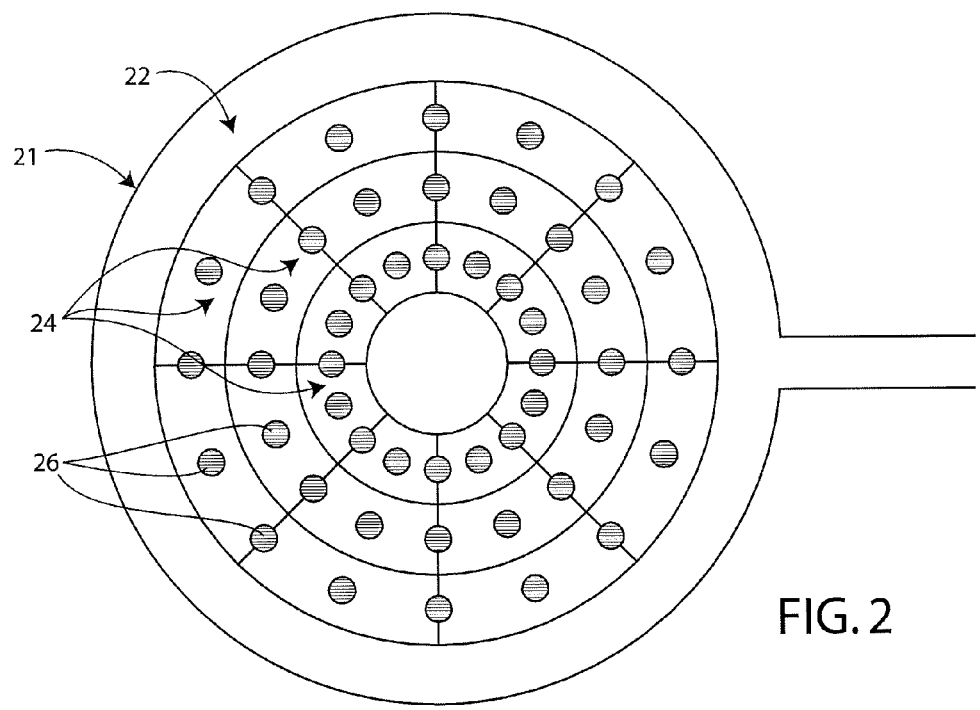
FIG. 2 is a detector reader of the invention.

FIG. 2 shows a detector 21 for use with the invention. Detector 21 is designed to be located at the base of a spindle. Detector 21 has an array 22 of sensors 26. The sensors 26 are arranged in a series of detecting rings 24 that correspond to the bands of a corresponding label and pattern as shown in FIG. 1. Because this detector is designed to be used in conjunction with the label 10 of FIG. 1, the sensors 26 are arranged into three rings 24. Preferably, there are two sensors 26 for every cell in a corresponding label. Therefore, detector 21 has 16 sensors in each ring 24. When two neighboring sensors in a ring detect the same reflective property, this indicates that a single cell has been identified and its reflective property determined. When only one sensor per cell is used, there is a risk of accidental double readings when a label is placed such that a cell partially covers a sensor. The sensors are preferably evenly spaced within each ring.

The sensors are preferably reflective object sensors that are commercially available and known to be used to detect the reflectivity or an object. Each sensor may alternatively comprise more than one reflective object sensor in order to provide validation, redundancy or serve as a back up, so that if one fails repairs will not be immediately necessary.

Typically it is unnecessary to use more than a ratio of two sensors per cell. However, one detector may be used for more than one type of label, such that the ratio of sensors per cell changes according to the label. For example, the detector 21 may be used for a label as shown in FIG. 1 or with a label having bands that are only divided into four cells each, or both alternatingly.

The numerical value of a label is represented by the number of cells that have the same reflective property (either reflective or non-reflective) in each concentric band. Each band represents a single digit in the thread identifying code. The more concentric bands the greater the numerical range, also the greater the number of cells in each concentric ring also increases the numerical range.

$N_r$=Numerical Range
$N_s$=Number of Coding Cells
$N_c$=Number of Concentric coding bands $$N_r=(N_s+1)^{Nc}$$

A pattern having seven non-reflective cells and one reflective cell in the first inner band, three non-reflective cells and five reflective cells in the middle band, and four non-reflective cells and four reflective cells in the outer band corresponds to a digital sequence 734 , or alternatively 154 , in base 8. Each thread data classification corresponds to a different code number and is listed in a database available to a user or the computer processor that operates the embroidery machinery. The base of the number system used for the code depends on the number of sectors and therefore the number of cells in the bands. This method of coding the patterns relies on the total number of cells sharing a reflective property in each band, regardless of sequence. For example, the outer band has four reflective and four non-reflective cells. It is irrelevant to the encoding method described here what sequence the cells are in. If all four of the reflective cells in the outer band are adjacent, or if they are interspersed between non-reflective cells, the outer band still codes for the digit 4.

An alternative coding approach is to make an inner band an index band, having an index cell that represents an index for bit 0. Additional concentric data bands use eight cells per band to each represent an eight bit byte. Bit data is stored by the reflective properties of reflective cells and non-reflective cells. The two data bands would represent a 16 bit number. Three data bands would represent a 24 bit number. Bit 0 of each band would be aligned with the index cell of the index band. The numerical range of this technique would produce a much greater numerical range. Two data bands would allow any number between 0 and 65,535.

In the above thread identifying code example, the index cell in the innermost ring is the only cell not blackened, i.e. non-reflective. This represent bit 0 for the outer rings. Assume we read in a clockwise direction with the least significant bit being the index sector position. Reflective white areas represent a 1 and non-reflective blackened areas represent a 0, we would get for data band 60 the value 01010111. Data band 62 would contain the value 10101001.

Additional alternatives could include a parity sector with even or odd parity where the number of reflective sectors is forced to be even or odd. The parity sector would take the position of the most significant bit. This reduces the numerical range of the coding scheme to 7 bits per data ring or 128 combinations, but may increase the readability and reliability of the data. With two data rings combined into a single 14 bit value the numeric range would be 0-16,383.

Concentric circular lines and radial lines that delineate the cells do not need to be printed on the label coding pattern and may be left out when the label is printed. Written or printed identifiers that allow a person to read the thread data of the label.

Figure 3:
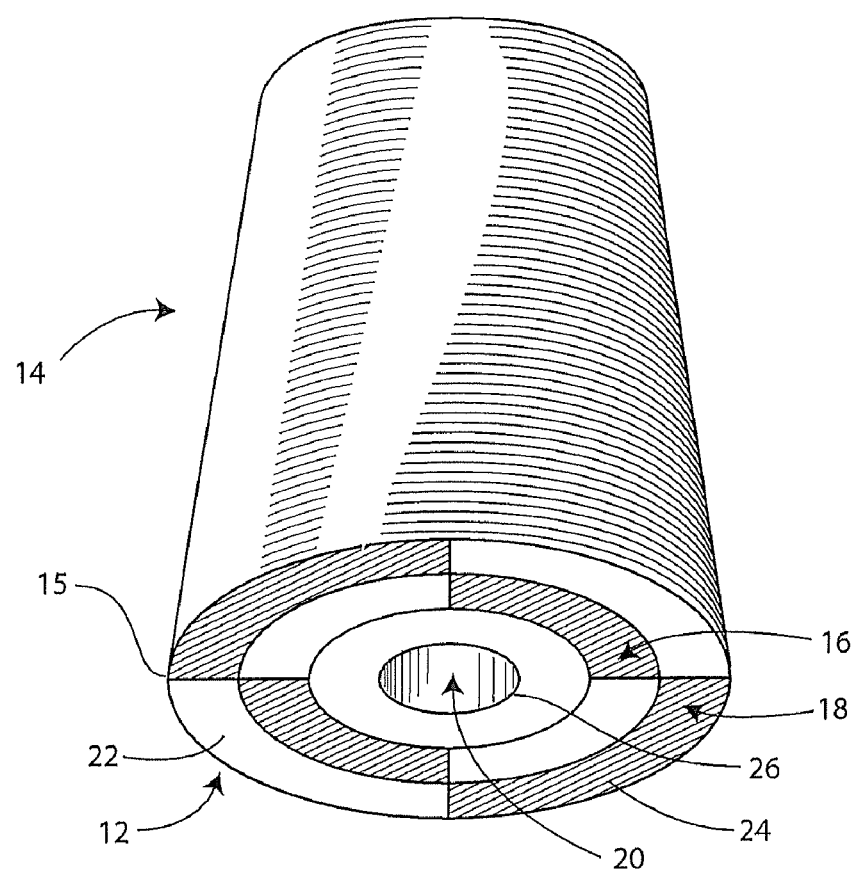
FIG. 3 is a perspective view of the thread identification system of the invention.
Figure 3:
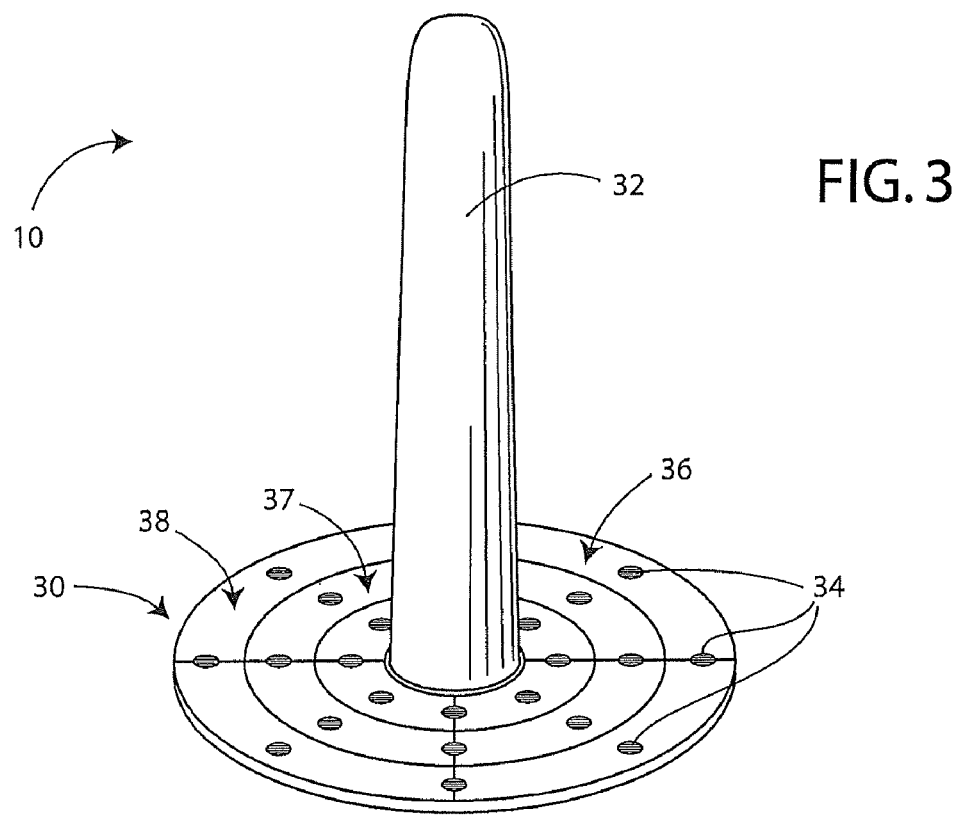

FIG. 3 shows a thread identifying system 10 including a label 12 and detector 30. Label 12 is attached to the base 15 of spool 14. Spool 14 is a spool, also known as a reel or cone, of thread for use with an embroidery or sewing machine. Shaft 20 extends at least partially through spool 14 and engages stand bar 32 to hold spool 14 in place on the base of a thread tree.

Label 12 has a hole 26 in its center corresponding to shaft 20. Label 10 is circular and has two concentric coding bands, inner coding band 16 and outer coding band 18, about hole 26. Each coding band is made up of coding cells. The coding cells in label 12 are either reflective, e.g. cell 22, or non-reflective, e.g. cell 24.

Code reader 30 surrounds spindle 32. Spindle 32 is a typical stand bar found on the base of a thread stand or tree common in embroidery machines. The detector 30 consists primarily of an array 36 of sensors 34. This array 36 is typically comprised of a series of concentric rings of sensors. In this embodiment, there are two rings of sensors, inner sensor ring 37 and outer sensor ring 38. In this embodiment, the sensors 34 are spaced such that there are two sensors per coding cell. The purpose of two sensors per cell is to assure that the pattern is properly read without regard to the orientation of the label and the sensor array. No matter what degree of rotation exists between the label and sensor array of the detector at least two adjacent sensors will read the same sector data.

The sensor data is preferably processed in such a fashion as to require two adjacent sensors to have the same output value to indicate a cell's reflective property. This interconnection would comprise a series of two input AND gates with each sensor's output connected to two AND gates. An array of sensors arranged in a concentric circle represents a single numerical entity. The first and last sensor are also interconnected via the AND gate array. The outputs or inputs of the AND array can be multiplexed to reduce circuit complexity or component count and shared with other concentric rings. The output of the AND array determines the numerical value of the desired concentric ring of sensors and can be serialized or kept in its original parallel form for subsequent reading by whatever system it is connected to.

Figure 4:
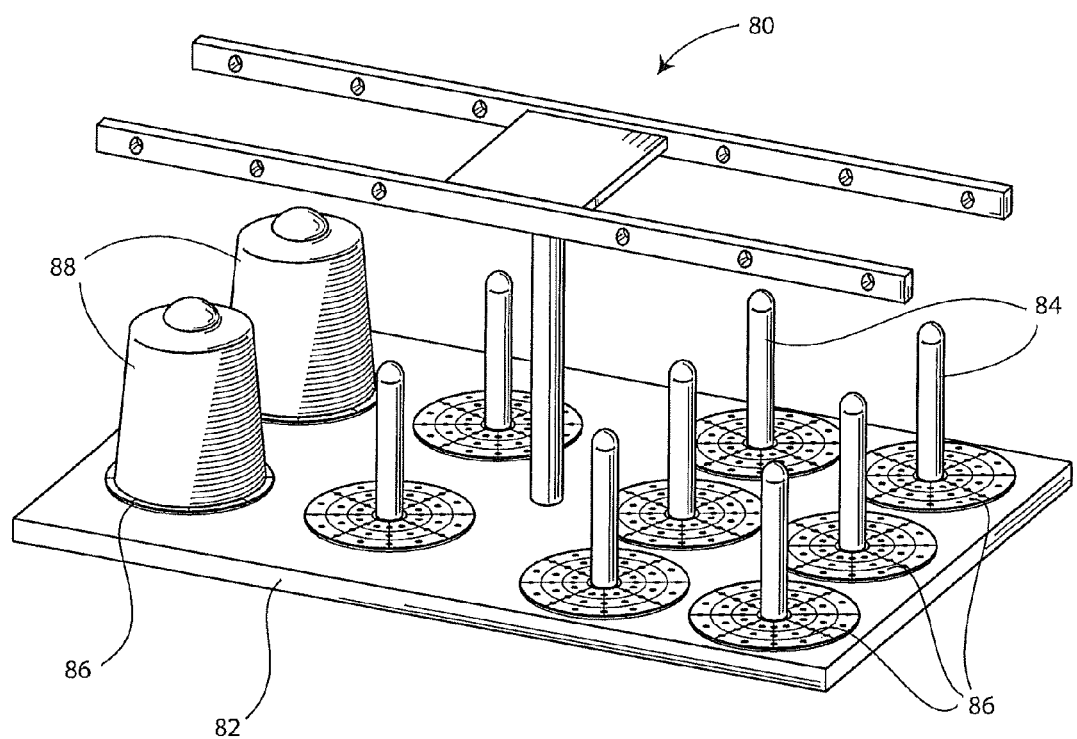
FIG. 4 is another perspective view of the invention.

FIG. 4 shows a thread tree typical of the type used with an embroidery machine. Thread tree 80 has a base 82 from which several spindles 84 extend upwardly. Spools 88 are placed on spindles 84 to hold them on the thread tree 80. Detectors 86 have been added to accommodate the thread tree 80 for use with the invention. Detectors 86 may be permanently incorporated into the base 82 or may be placed about the base of each spindle 84 of an existing thread tree in order to use the invention with existing embroidery and other sewing machines. As will be appreciated by those skilled in the art, spools 88 are placed on spindles 84 without regard to any particular rotational orientation. Vibration of the thread tree may also cause pivotal movement of the spools about the spindles after they have been placed on the thread tree. However, because of its ability to read the pattern regardless of rotational orientation, the invention is well suited for reading the label.

Figure 5:
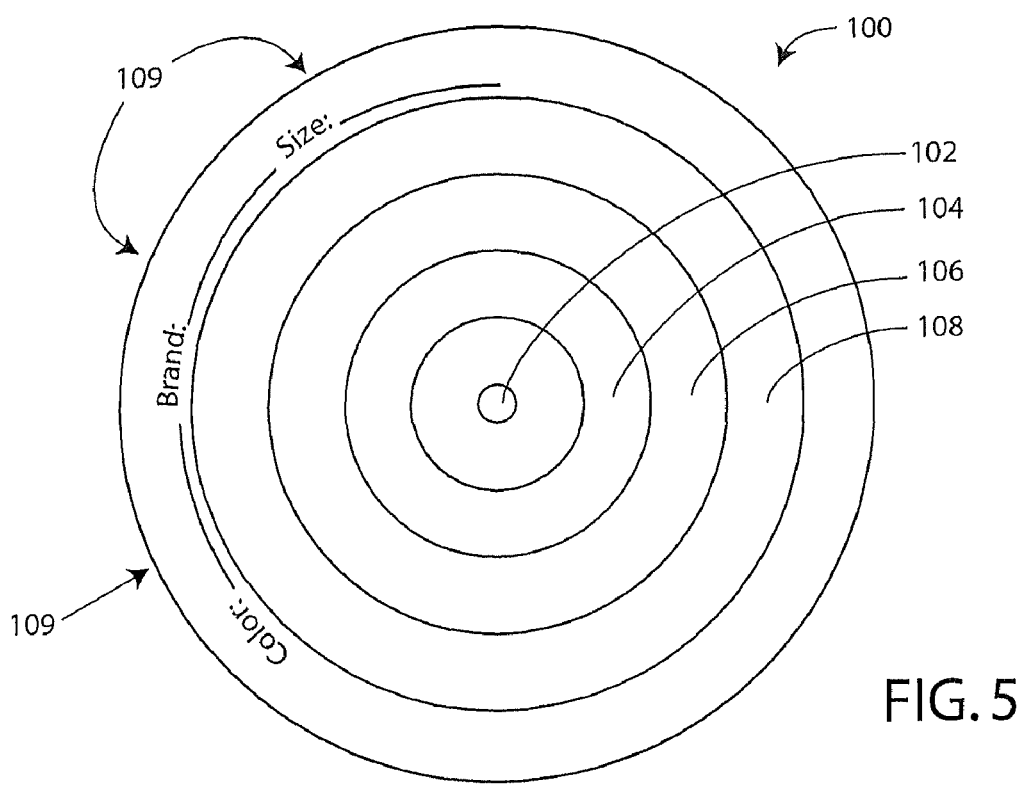
FIG. 5 is an alternative embodiment of the label of the invention.

FIG. 5 shows an alternative embodiment of a label of the invention. This embodiment shows a very simple version of the label 100. Label 100 has a center hole 102 for accommodating a spindle, also referred to as a stand bar. Identifiers 109 may be printed, typed or written to allow an embroidery machine operator to read the information stored in the coded pattern of the label. In this embodiment, the label includes inner concentric band 104, middle concentric band 106 and outer concentric band 108, each of which comprise a single coding cell. No radial lines divide the bands into sectors. This design is more practical when there is very little information to be encoded or when photosensors capable of distinguishing different colors are used. It is also possible to expand this design to include several black or white bands such that a circular UPC type code is formed which a detector having a laser could read. This is typically not preferred primarily due to the difference in cost and complexity between such as design and the use of simpler reflective object sensors.

Figure 6:
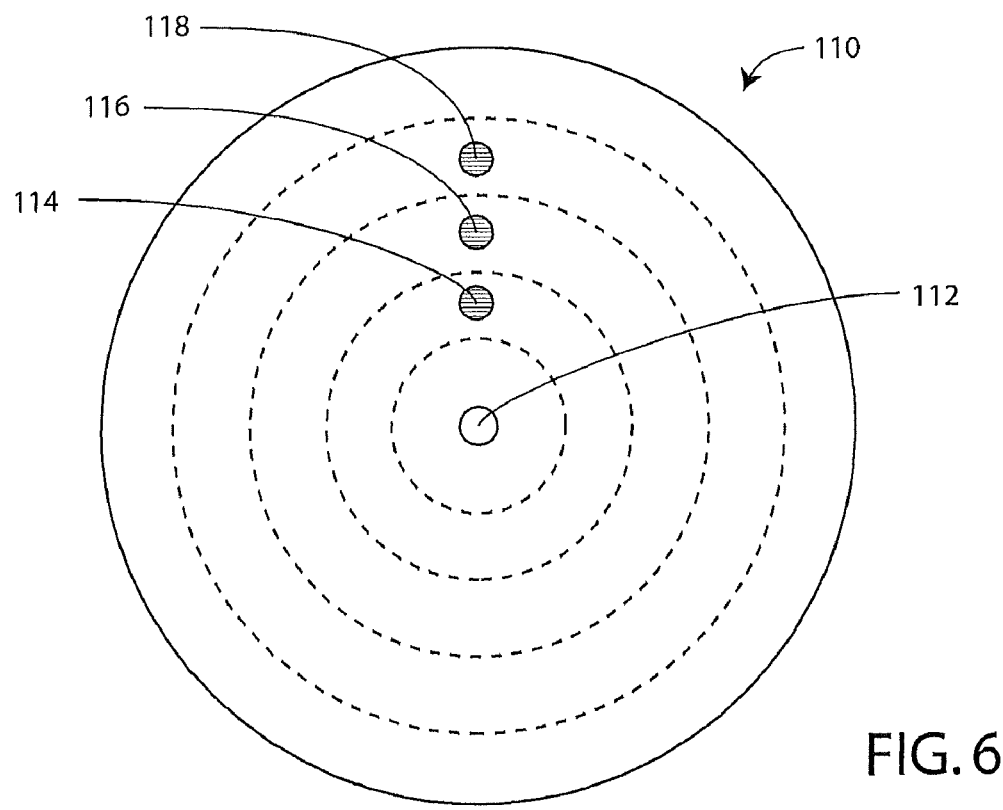
FIG. 6 is an alternative embodiment of the detector of the invention.

FIG. 6 shows a detector, or code reader, 110 corresponding to the label 100 of FIG. 5. Label 110 has an inner sensor ring 114, middle sensor ring 116 and outer sensor ring 118 corresponding to each of the bands of label 100. Because there is only a single cell per band, there is no need to have two sensors per cell.

Figure 7:
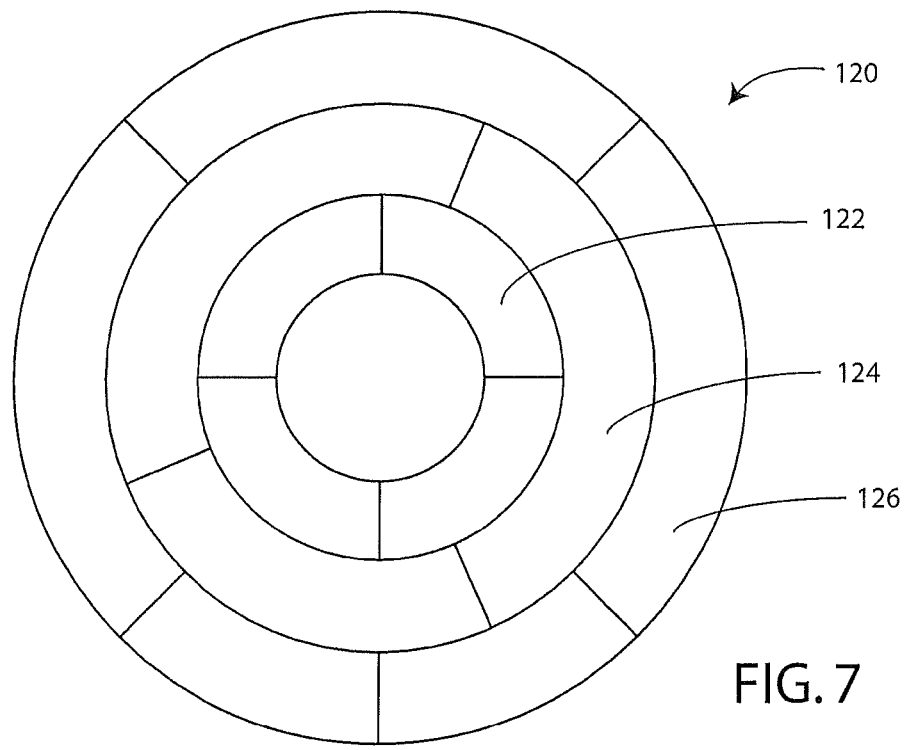
FIG. 7 is an alternative embodiment of the label of the invention.

FIG. 7 shows an alternative embodiment of a pattern 120 for use on a label of the invention. This embodiment illustrates that it is possible to have multiple bands divided into different numbers of coding cells by different radial lines. Inner band 122 is divided into four cells by four radial lines unique to it. Similarly, outer band 126 is divided into four coding cells by four different radial lines. Band 124 greatly reduces the symmetry of the label pattern 120 by being comprised of three congruent cells delineated by three radial lines. Although such a pattern is not preferred because it needlessly complicates the pattern, it works equally well for use with the thread identification system of the invention so long as the cells within a particular band are congruent to each other.

Figure 8:
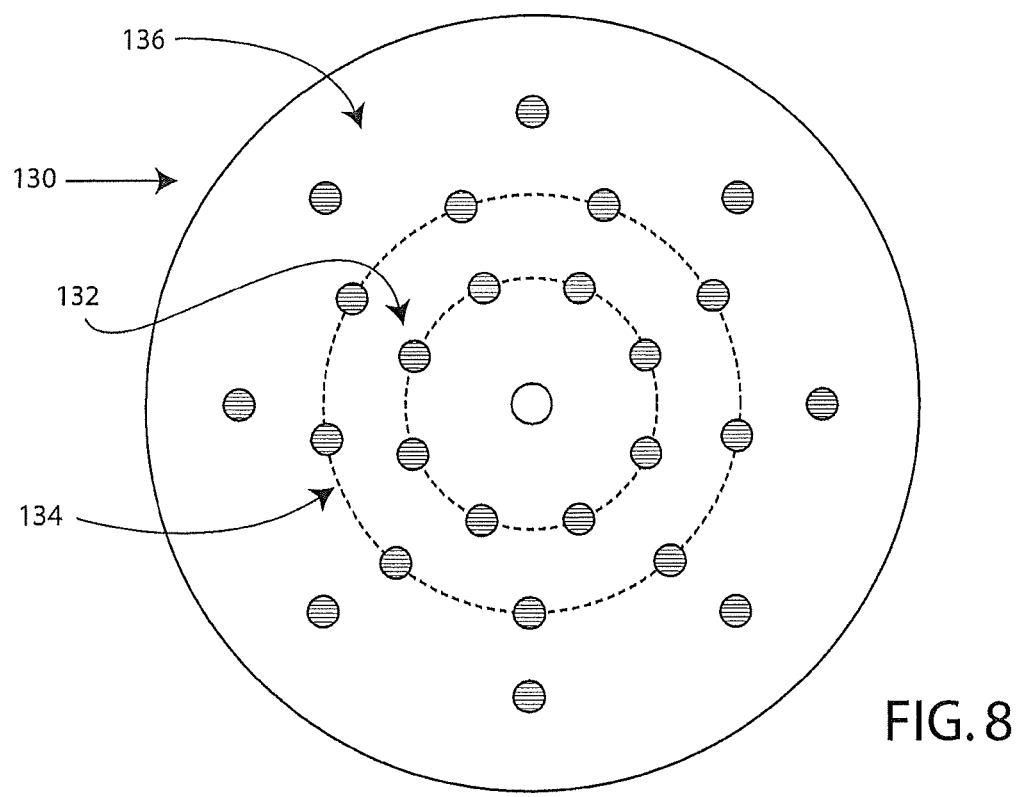
FIG. 8 is an alternative embodiment of the detector of the invention.

FIG. 8 shows a detector 130 having an inner detecting sensor ring 132 and an outer detecting sensor ring 136, each having eight sensors 138 to provide a ratio of two sensors for every cell in the corresponding inner and outer bands of the label in FIG. 7. Middle detecting sensor ring 134 has nine sensors 138, giving it a ratio of three sensors per corresponding cell. This illustrates that the ratio of sensors to cell may vary, even between rings of the same detector. The primary features of the thread identification system of the invention are that the cells within the same band are congruent, that is they are the same size, being radially aligned and having the same arc lengths.

Figure 9:
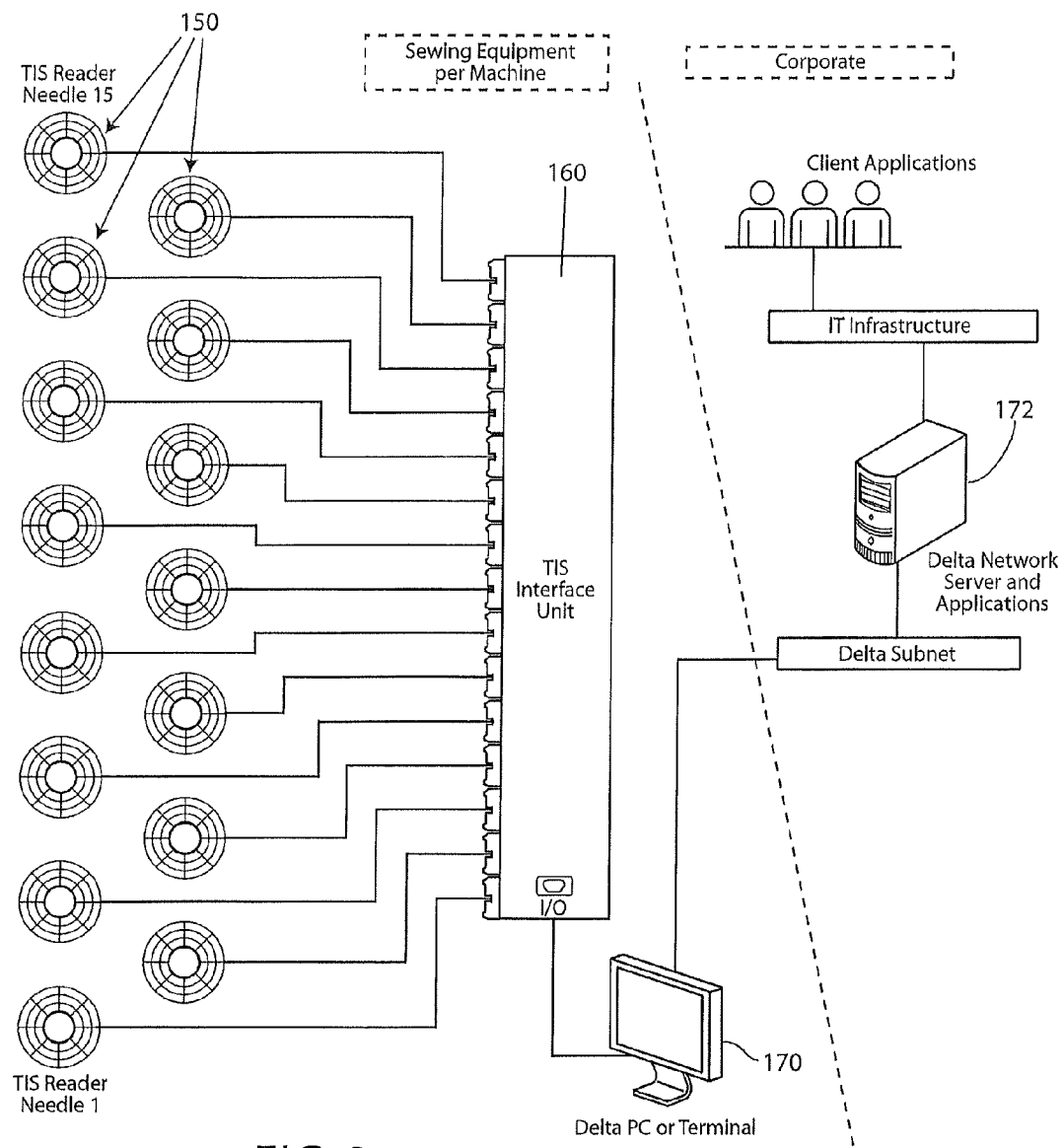
FIG. 9 is a diagrammatic view of a computer system incorporating the invention.

FIG. 9 shows an environment in which the thread identification system of the invention may be used. Detectors 150 are incorporated into an embroidery machine as shown in FIG. 4. Each detector corresponds a needle to which its corresponding spool is supplied. The signals generated by the sensors of each detector 150 are transmitted to an interface unit 160. The interface unit decodes that pattern of each label, thereby identifying the type of thread on each needle of an embroidery machine. This information is supplied to software on a computer processor 170 that utilizes this information to generate a stitch pattern used to control the embroidery machine such that a design is accurately stitched onto a sewing area of a substrate, such as a shirt or name tag. The computer controlling the individual embroider machine is preferably in communication with a central computer network 172 which may supply patterns for which stitch patterns are to be generated. The software loaded on processor 170 may provide various outputs, including requests that the threads on particular needles be changed. Optionally, the information regarding the threads loaded on individual embroidery machines may be shared with the network 172 such that the network can determine which stitch jobs provided by clients should be assigned to which embroidery machines.

Whereas, the present invention has been described in relation to the drawings attached hereto, it should be understood that other and further modifications, apart from those shown or suggested herein, may be made within the spirit and scope of this invention. The Figures and text corresponding thereto are only to be considered exemplary, preferred embodiments representative of features of the invention. Unless otherwise expressly limited, words and terms used herein are to be given the full breadth of their plain and ordinary meaning. Features shown or described in the embodiments, figures and text of the specification whose qualities and aspects are not expressly delimited are modifiable by and/or replaceable with like features that accomplish substantially the same function (s) and have substantially the same relationship(s) to the salient features of the invention. Features shown or described in the embodiments, figures and text of the specification whose qualities and aspects are expressly delimited are restricted only regarding the specific manners in which so stated.

The invention claimed is:

1. A thread identification system comprising:
   a label having one or more concentric coding bands, wherein each of the bands comprises one or more congruent cells, wherein each of the cells has a reflective property and the cells collectively form a coding pattern;
   a detector capable of identifying the coding pattern by determining the reflective properties of the cells of the label and comprising a plurality of concentric sensor rings, wherein each of the sensor rings comprises one or more reflective sensors;
   a database comprising a plurality of coding patterns each assigned to one of a plurality of thread types;
   wherein the number of sensors in each of the one or more sensing rings is equal to or greater than the number of cells in each of the corresponding coding bands; and,
   wherein the reflective properties of the cells are identifiable by the sensors of the detector when the label and the detector are substantially flush.

2. The thread identification system of claim 1 wherein the number of sensors is twice the number of cells.

3. The thread identification system of claim 2 wherein the reflective properties of the cells is selected from the group consisting of reflective and non-reflective.

4. The thread identification system of claim 1 wherein the one or more coding bands comprises three coding bands, wherein each of the three coding bands comprises eight radially aligned, congruent coding cells aligned in eight sectors.

5. The thread identification system of claim 1 wherein the coding patterns having the same number of cells with the same reflective property in the same bands without regard to linear sequence along the bands are assigned to the same thread type.

6. The thread identification system of claim 5 wherein the number of sensors is twice the number of coding cells.

7. The thread identification system of claim 6 wherein reflective property of each of the cells is selected from the group consisting of reflective and non-reflective.

8. The thread identification system of claim 1 wherein the one or more concentric coding bands comprises an index band comprising a plurality of congruent cells and a plurality of data bands each comprising a plurality of congruent cells, wherein the cells of the index band and the cells of the data bands are arranged in a plurality of sectors, and the coding patterns are distinguishable according to linear sequences of the reflective properties of the cells located in each of the data bands, wherein the linear sequences of each of the data bands begins at the sector indexed by the cell of the index band having a reflective property different from the reflective properties of the other cells of the index band.

9. The thread identification system of claim 8 wherein the plurality of outer coding bands comprises two outer coding bands.

10. The thread identification system of claim 8 wherein the index coding band comprises eight congruent coding cells and each of the coding bands comprise eight congruent coding cells.

11. The thread identification system of claim 10 wherein the number of sensors is twice the number of coding cells.

12. The thread identification system of claim 11 wherein the reflective property of each of the cells is selected from the group consisting of reflective and non-reflective.

13. A method of identifying the type of thread on a spool of an embroidery machine comprising:
   assigning a plurality of patterns to a plurality of thread types such that the patterns correspond to particular thread types, wherein the patterns consist of series of coding cells arranged in one or more concentric bands upon circular labels, wherein all of the coding cells located within the same bands of the labels are congruent and each of the cells have a reflective property wherein the pattern is characterized by the sequence of reflective properties of the cells;
   storing the patterns and corresponding thread types in a database in a computer storage device;
   attaching the at least one of the labels to the bottom of a thread spool;
   placing the thread spool on a spindle of an embroidery machine such that the label is substantially flush with a detector at the base of the spindle, wherein the detector comprises a plurality of reflective object sensors arranged in one or more concentric sensor rings that correspond to one or more of the concentric coding bands such that the detector may determine the reflective properties of the coding cells of the label;
   reading the pattern on the label with the detector and transmitting the read pattern to a computer processor;
   comparing the pattern read by the detector to the patterns stored in the database; and,
   identifying the thread type on the spool according to the pattern on the label.

14. The method of identifying the type of thread on a spool of claim 13 wherein the number of reflective object sensors is twice the number of coding cells and the detector recognizes the reflective property of a cell when two adjacent reflective object sensors in one of the sensor rings register the same reflective property.

15. The method of identifying the type of thread on a spool of claim 13 wherein the pattern comprises at least two concentric bands comprising an inner band having at least four congruent coding cells and a second band having the same number of congruent coding cells and wherein the coding cells of the inner band and the second band are radially aligned into congruent sectors.

16. The method of identifying the type of thread on a spool according to claim 15 wherein the at least two concentric bands comprises an index band and at least one data bands, wherein the cells of the index band and the cells of the data bands are arranged in a plurality of sectors, and the coding patterns are distinguishable according to linear sequences of the reflective properties of the cells located in the data bands, wherein the linear sequences of each of the data bands begins at the sector designated by an index cell of the index band having a reflective property different from the reflective properties of the other cells of the index band, with all of the other cells of the index band having the same reflective property.

17. The method of identifying the type of thread on a spool according to claim 13 wherein the coding patterns having the same number of cells with the same reflective property in the same bands without regard to linear sequence along the bands are assigned to the same thread type.

18. The method of identifying the type of thread on a spool according to claim 13 wherein the reflective property of each of the cells is selected from the group consisting of reflective and non-reflective.

19. The method of identifying the type of thread on a spool according to claim 17 wherein the reflective property of each of the cells is selected from the group consisting of reflective and non-reflective.

* * * * *